(12) United States Patent
Reinecke et al.

(10) Patent No.: US 6,795,255 B2
(45) Date of Patent: Sep. 21, 2004

(54) PROJECTION OBJECTIVE

(75) Inventors: Wolfgang Reinecke, Zeuthen (DE); Horst Linge, Kaufungen (DE)

(73) Assignee: Optische Systeme Gottingen ISCO-Optic GmbH, Gottingen (DE)

( * ) Notice: Subject to any disclaimer, the term of this patent is extended or adjusted under 35 U.S.C. 154(b) by 129 days.

(21) Appl. No.: 10/181,700

(22) PCT Filed: Jan. 16, 2001

(86) PCT No.: PCT/DE01/00160
§ 371 (c)(1),
(2), (4) Date: Oct. 29, 2002

(87) PCT Pub. No.: WO01/53869
PCT Pub. Date: Jul. 26, 2001

(65) Prior Publication Data
US 2003/0112525 A1 Jun. 19, 2003

(30) Foreign Application Priority Data
Jan. 18, 2000 (DE) .......................................... 001 00 890

(51) Int. Cl.[7] .............................. G02B 9/00; G02B 9/64
(52) U.S. Cl. ......................... 359/755; 359/649; 359/754
(58) Field of Search ................................ 359/755, 754, 359/649

(56) References Cited

U.S. PATENT DOCUMENTS

| 2,701,982 | A | 2/1955 | Angelaux |
| 2,897,724 | A | 8/1959 | Rosier |
| 3,005,379 | A | 10/1961 | Klemt |
| 4,704,011 | A | 11/1987 | Mercado |
| 4,812,027 | A | 3/1989 | Yanagisawa |
| 6,366,410 | B1 * | 4/2002 | Schultz et al. .............. 359/649 |

FOREIGN PATENT DOCUMENTS

| DE | 3029929 | 2/1982 |
| DE | 3029916 | 3/1982 |
| DE | 3633032 | 6/1987 |
| DE | 3833946 | 4/1990 |
| EP | 0585651 | 3/1994 |

* cited by examiner

Primary Examiner—Scott J. Sugarman
(74) Attorney, Agent, or Firm—Price, Heneveld, Cooper, DeWitt & Litton, LLC

(57) ABSTRACT

A lens assembly comprising seven lenses. Each lens includes u greater than or equal to about 12.8°, LEP equal to or from about 100 mm to about 400 mm, σRba greater than or equal to about 1°, and σRbi less than or equal to about −14°. The outward ray angle slopes and the inward ray angle slopes are positive if the outward ray and the inward ray intersect the optical axis at a location which, when seen from the object, is in an opposite direction to projection. The outward ray angle slopes and the inward ray angle slopes are negative if the outward ray and the inward ray intersect the optical axis at a location which, when seen from the object, is in an opposite direction to projection.

8 Claims, 10 Drawing Sheets

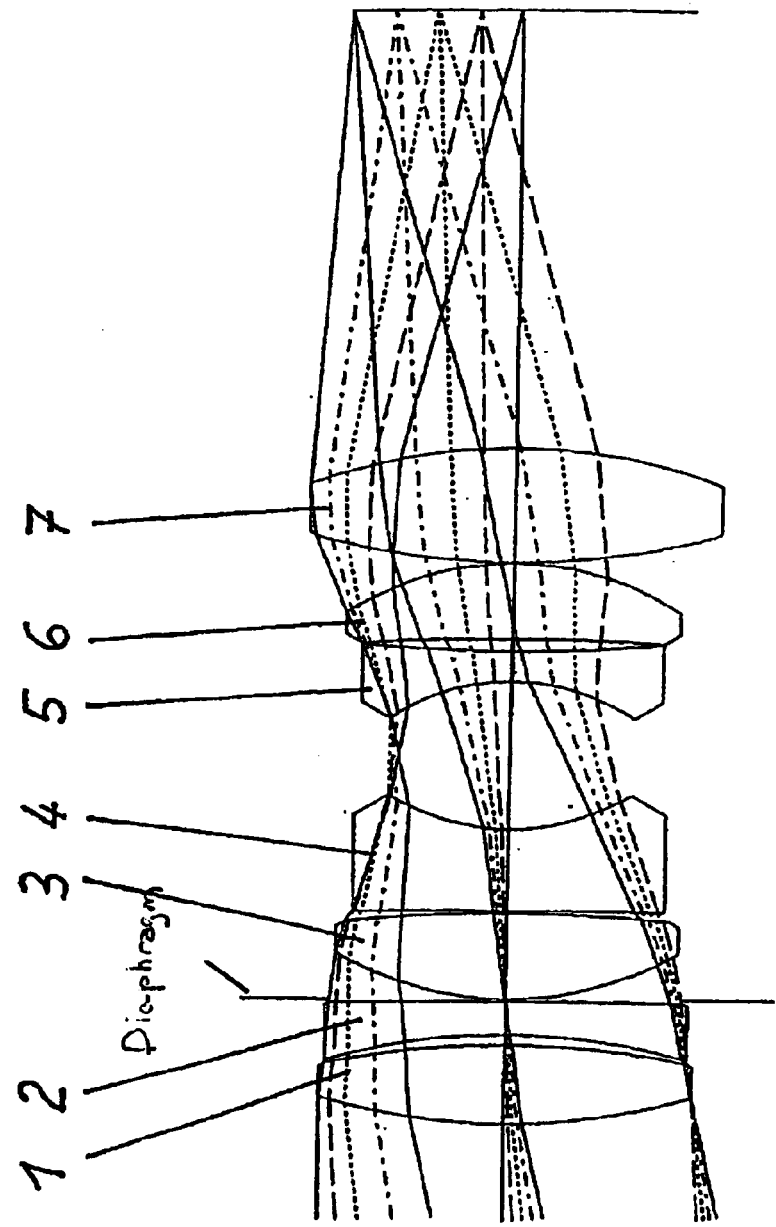

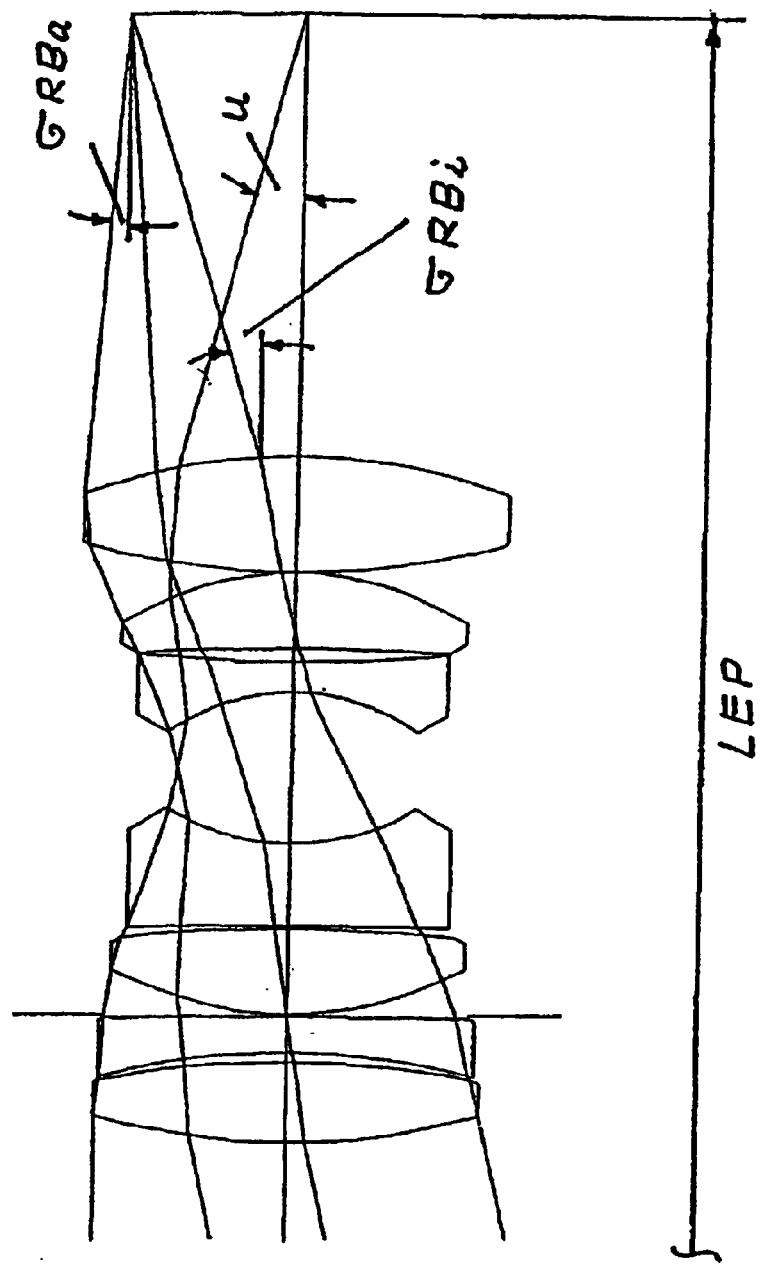

FIG. 1.2
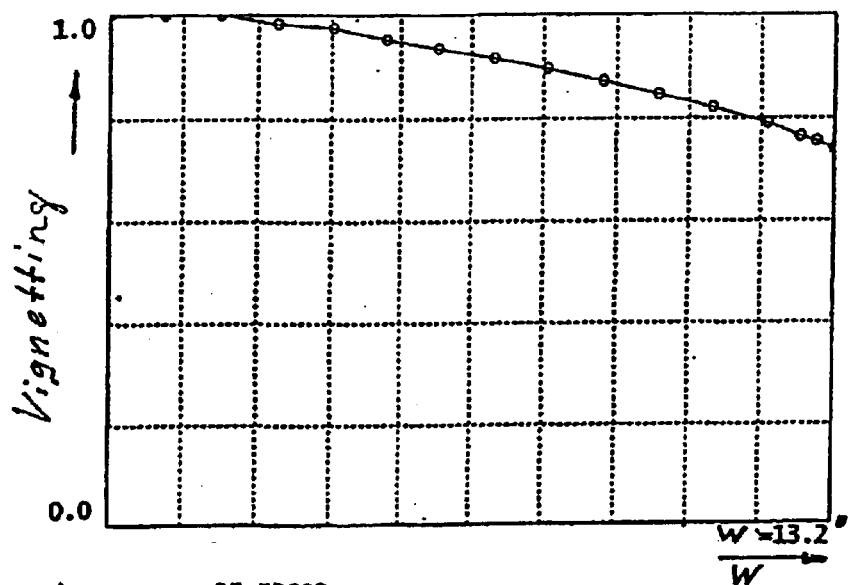
FIG. 1.3
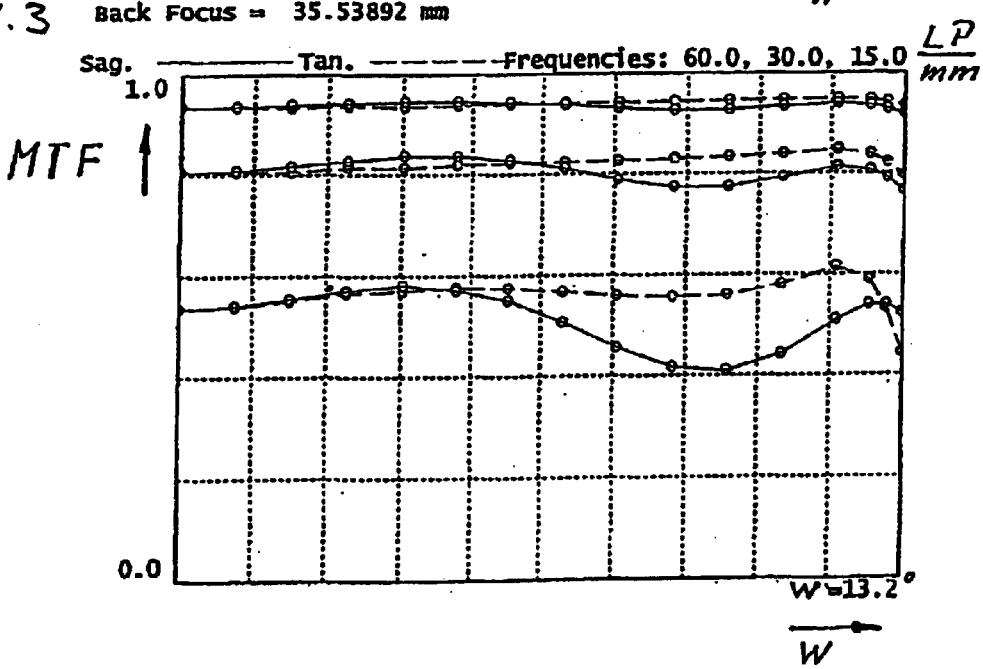

FIG. 1.4
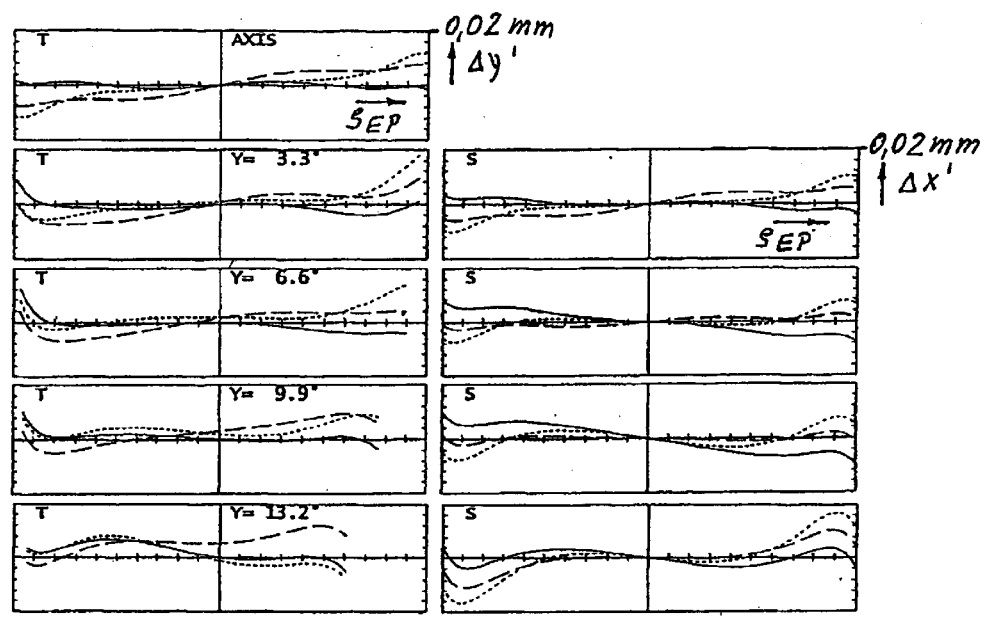
Wavelengths [nm]:
587.60　　　　656.30　　　　486.10

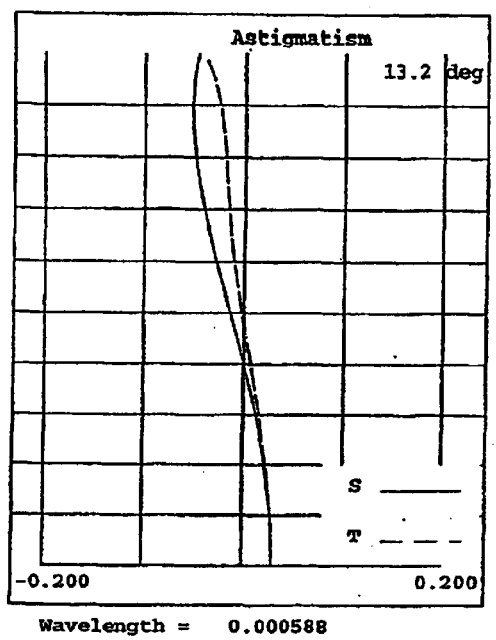
FIG. 1.5a
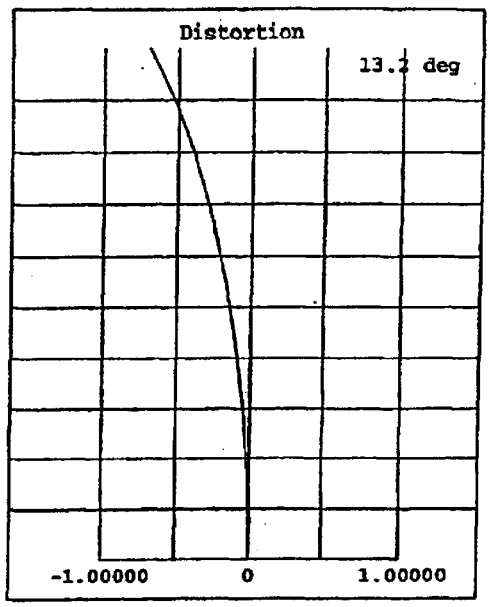
FIG. 1.6
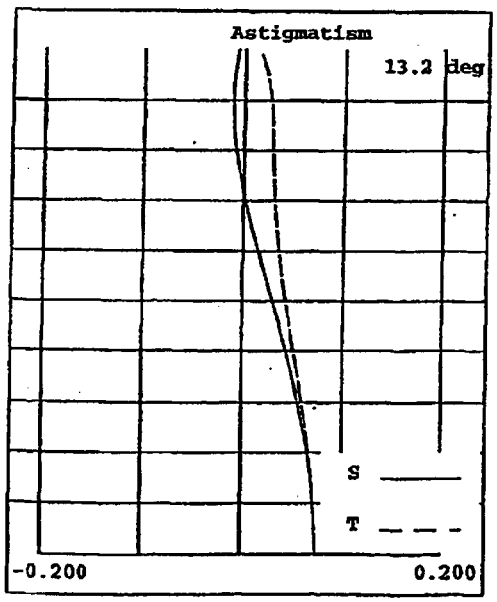
FIG. 1.5b
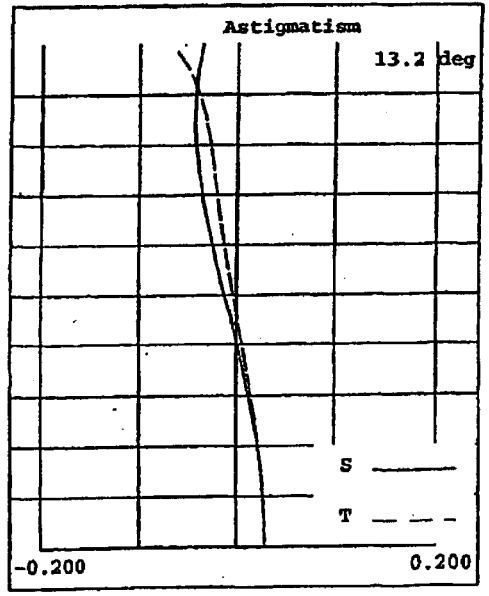
FIG. 1.5c

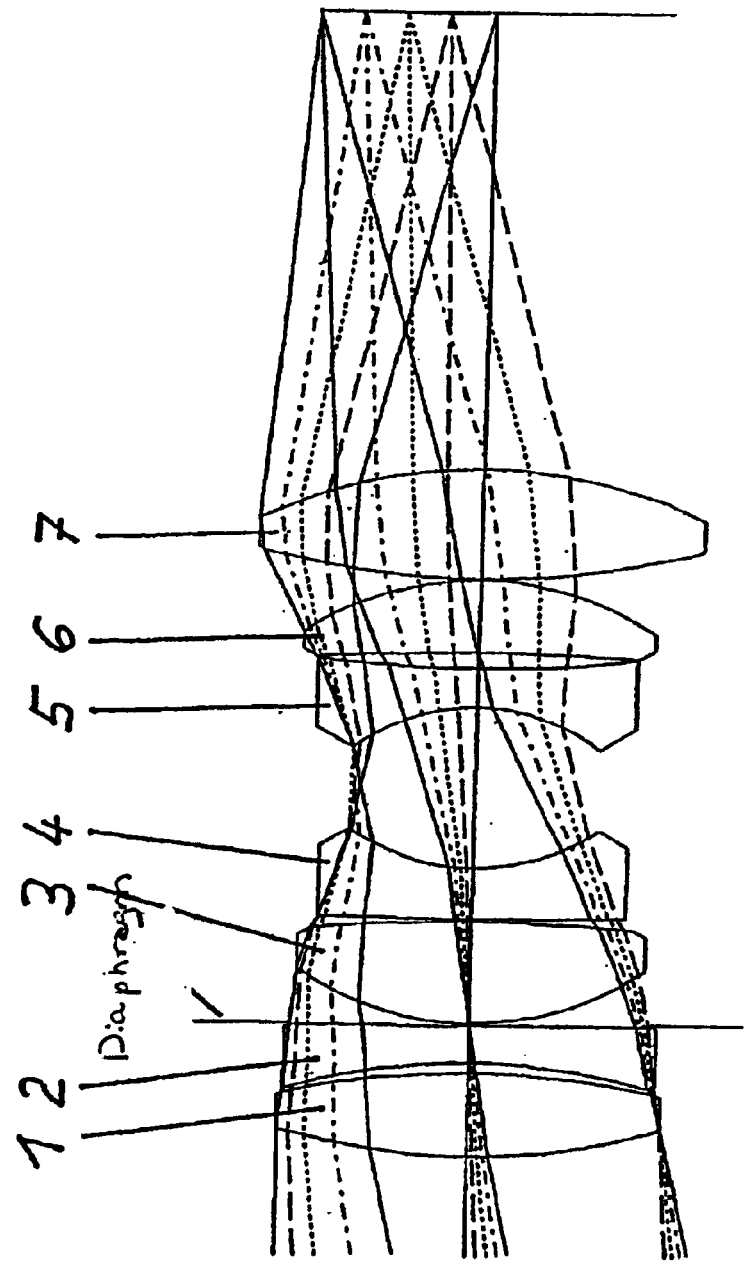

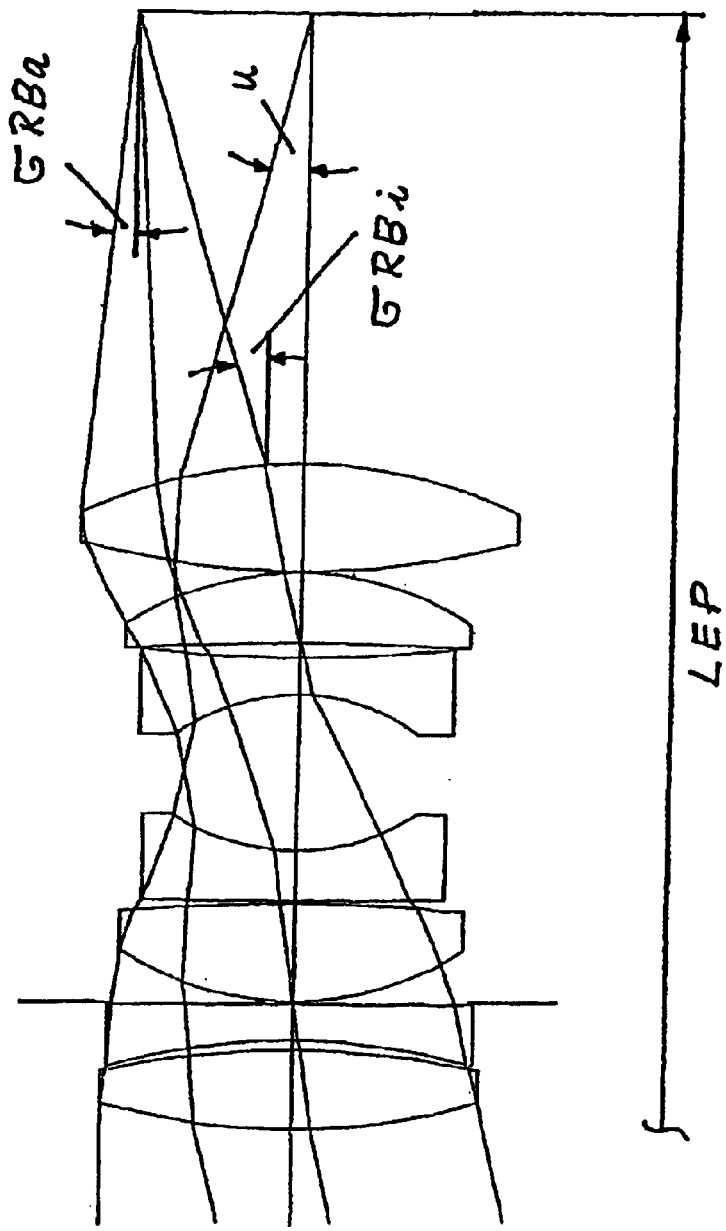
FIG. 2.1.B

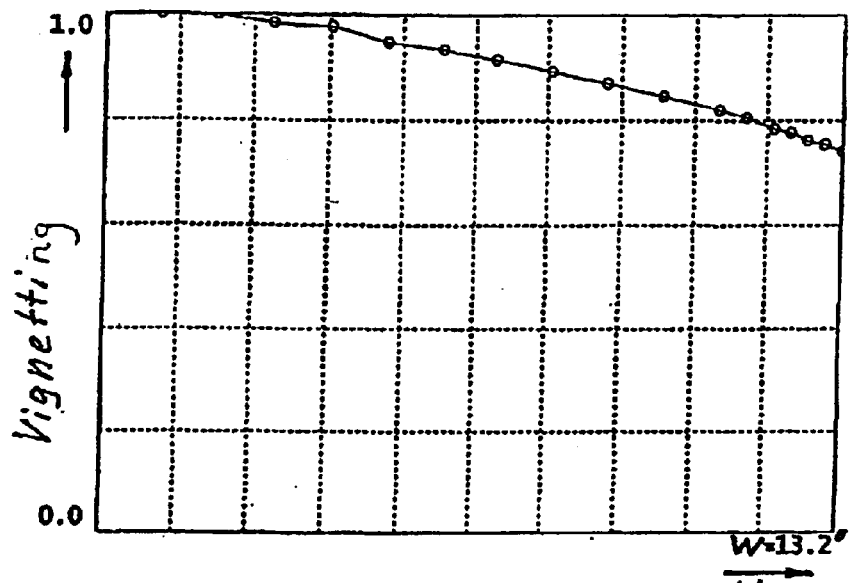
FIG. 2.2
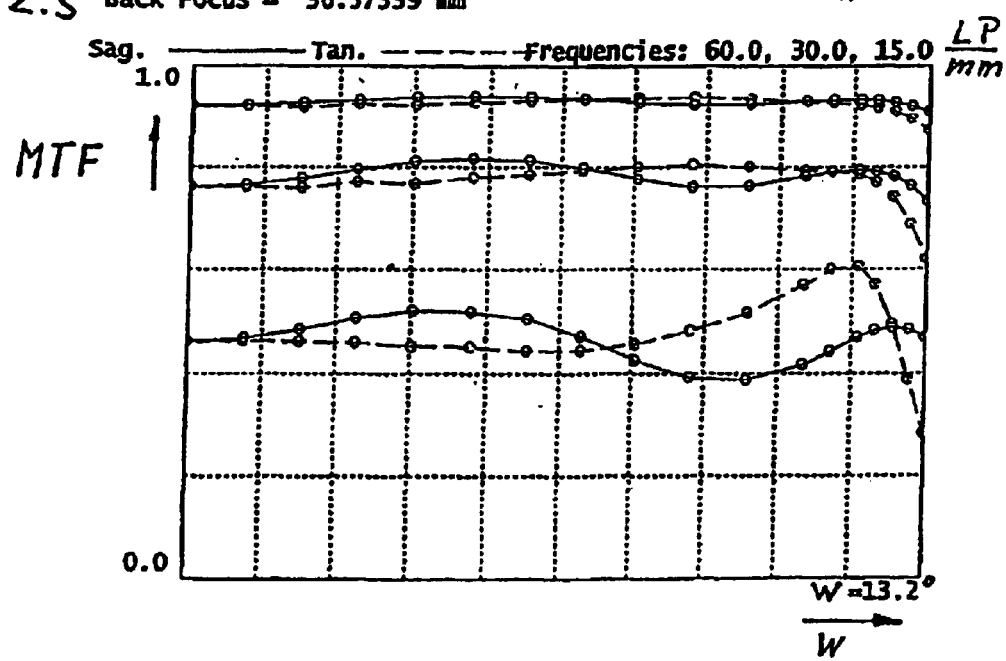
FIG. 2.3 Back Focus = 36.57539 mm

FIG. 2.4
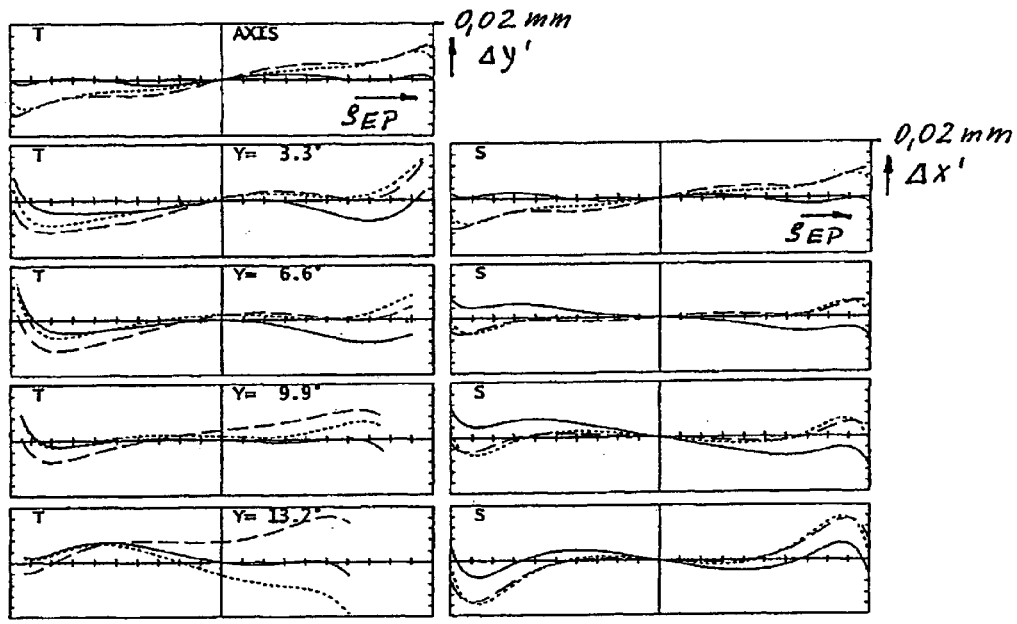
Wavelengths [nm]:
——————  — — — —  ·············
587.60      656.30       486.10

FIG. 2.5a
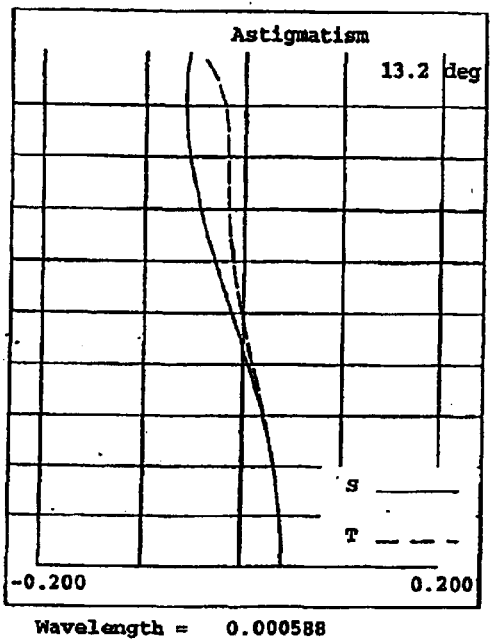
FIG. 2.6
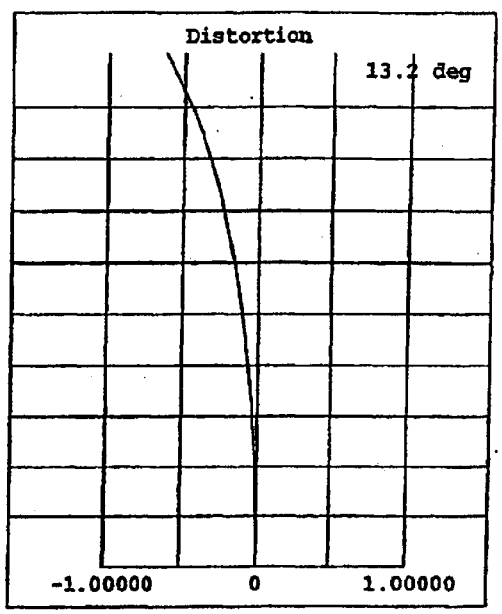
FIG. 2.5b
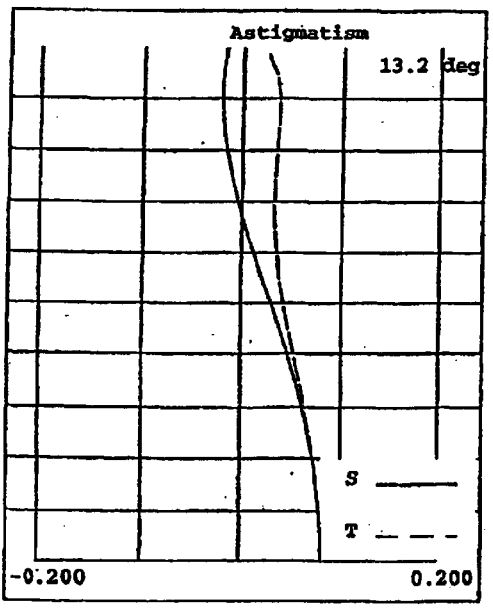
FIG. 2.5c
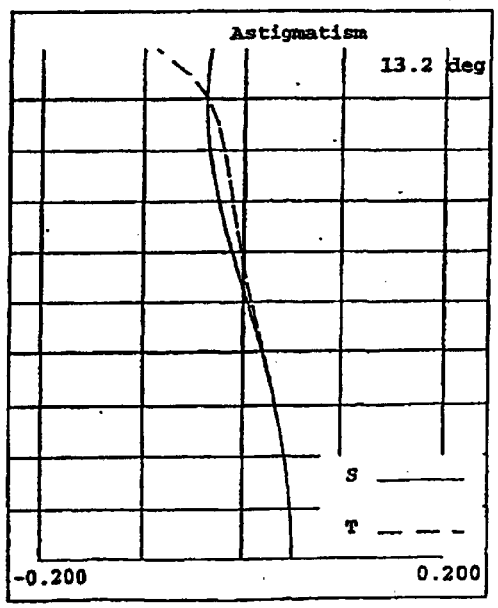

PROJECTION OBJECTIVE

This application is the National Phase of International Application No. PCT/DE01/00160, filed in Germany on Jan. 16, 2001 designating the United States of America, which claims priority to EP Patent Application No. 001 00 890.3, filed on Jan. 18, 2000.

FIELD OF THE INVENTION

The invention's main scope of application is in movie projection, especially with 35 mm film.

BACKGROUND OF THE INVENTION

The invention relates to a luminous projection objective. Known objectives of this type (DE-OS3833946) have been designed for the requirements with projections, whereby the focus is mostly on the grade of reproduction quality. Over many years this has led to a variety of modified Double Gauss objectives (DEOS 3633032, U.S. Pat. No. 4,704,011), which most of all sought to further reduce aberrations. Among other things, one result of this development is that in an advantageous design development, the diaphragm is preferably located in the larger space between the hollow inner surfaces of meniscus-shaped lenses, which is characteristic for Double Gauss objectives. However, this location, though advantageous for the correction of aberrations, exhibits significant disadvantages with projections, as the entrance pupil's resulting location on the lighting side is not adjusted in the best possible manner. Documents DE-OS 3029929 and DE-OS 3029916 point out the pupils' locations and their significance in relation to condenser adjustment in projections. The locations of entrance pupils, however, are not the only deciding factor in their best possible adjustment to lighting. Rather, the influence of solid angles above the lit object area on a partial luminous flux must be considered. These typical luminous flux diffusion characteristics require the adjustment of all object parameters relevant to lighting: location of an entrance pupil, opening and angles $\sigma RBa$, as well as $\sigma RBi$, restricting bundles. If this is not the case, such as with thus far known technical solutions, losses in the projected images' illumination intensity are the result.

SUMMARY OF THE INVENTION

The purpose of the invention is an objective, respectively a series of objectives, which on one hand guarantees the most effective use of luminous flux diffusion throughout an entire object area and on the other hand exhibits image quality, which is better or the same as the image quality of known technical solutions being used with technologically advantageous glasses.

In accordance with the invention, this goal is accomplished with an objective according to the characteristics in claim 1. An objective according to the invention is characterized in that it maintains all effectivity parameters for adjustment to condenser systems in comparison to the aforementioned systems (DE-OS 3833946). Specifically, this indicates among other things an increase in the opening relationship from 1:2.4 to 1:1.9 and a reduction in vignetting of 61% to 73% for the most outward field point. This considerable expansion of the opening, axially as well as extra-axially, was achieved while maintaining image quality, including all image aberrations, when compared to the aforementioned systems.

The projection objective's design development according to the invention is already different from known solutions according to documents U.S. Pat. Nos. 2,701,982, 2,897,724 and 3,005,379 in that they are system examples with sealing devices. Also, reproduction quality is substantially worse with these objectives. Furthermore, neither the number of lenses nor the sequence of refractive power and lens shape match in the objectives of U.S. Pat. No. 2,701,982 and 2,897,724. Though the sequence of refractive power is identical to a system as per U.S. Pat. No. 3,005,379, the shape is not. Only the first and last lenses are the same as far as shape is concerned.

According to claim 1, an objective according to the invention satisfies the stated conditional equations, guaranteeing the most effective adjustment to the condenser systems. In order to illustrate the characteristics of this component of the invention, the luminous flux diffusion of the condenser systems employed in the projection of movies must be explained in further detail. Luminous flux diffusion means a partial luminous flux' dependence on the solid angle for a small area element at object level. A solid angle's zero axis runs through the field point in view and is parallel to the lighting system's axis. The characteristics of spatial luminous flux diffusion following in direction of projection behind this small area element contain all the properties of a condenser system relevant to lumen technology. The luminous flux' diffusion depends on the object area and exhibits diffusion at the lighting system's axis, which is virtually radial in symmetry. With smaller solid angles in the direction of the axis, the luminous flux is zero due to constructive necessity, it increases at a steep rise up to its peak value, and then flatly decreases outwardly. This diffusion changes outward via the object area. Radial symmetry is thereby lost, and the maximum of luminous flux diffusion moves in the direction in which the entrance pupil's center appears, when seen from the lit field point. In that part of the bundle of rays, mirrored at the solid angle's axis and located toward the maximum of luminous flux diffusion, the luminous flux is reduced significantly. Its maximum value only amounts to a fraction in comparison to the other portion of the bundle. Energetic diffusion therefore becomes highly asymmetrical.

For example, if objective aperture $u=14.7°$ (equivalent to a diaphragm value of $k=1.9$ at a fictitious projection distance of infinite) in the reproduction of an object area's border sections and is therefore well adjusted to the lighting aperture, but the location of the entrance pupil LEP is <100 mm, the result will be that an essential portion of the exterior entrance pupil area, which is located opposite the viewed field point in relation to the optical axis, is not at all involved in the reproduction; and on the other hand essential parts of luminous flux diffusion in the exterior entrance pupil area, located on the same side as the viewed field point in relation to the optical axis, are clipped, even with only minor vignetting. Furthermore, an aperture of only $u=11.8°$ (equivalent to $k=2.4$) will lead to yet larger losses of light, as portions of the luminous flux maximum's environment are clipped. This effect is even greater with increased vignetting.

However, if the location of the entrance pupil is LEP>400 mm with an aperture of $u=14.7°$, significant parts of the luminous flux' diffusion are clipped by exterior entrance pupil areas, located opposite the viewed field point in relation to the optical axis, and the luminous flux has negligible values in the exterior entrance pupil areas, located on the same side as the field point viewed in relation to the optical axis. One must further observe that an entrance pupil's location of LEP>400 mm results in larger lens diameters on the object's side and impedes the correction of aberrations.

This is the case with the mentioned systems (DE-OS 3833946), which are already known.

All these significant disadvantages have been removed with an objective according to the invention. An aperture of $u=14.7°$ ($k=1.9$) captures the energetically essential part of a luminous flux on the axis. In field range, the location of entrance pupil LEP and angles σRBa and σRBi, restricting the bundles, ensures that the objective captures the luminous flux infiltrating each area element in the field in the best possible manner and that the luminous flux is therefore utilized for the projection image's illumination intensity. At the same time it is thus prevented that areas of the pupil are infiltrated by energetically non-essential bundles of light, which do not reasonably play a significant role in the composition, but unnecessarily impede the balance of reproduction aberration compensation and result altogether in worse reproduction quality.

One essential performance increase in optical reproductions with technologically advantageous glasses could only be achieved with a modified sequence of positive and negative refraction power, while largely maintaining a Double Gauss structure favoring aberrations, whereby it was necessary to allow for an increase in the lenses' individual aberrations.

To produce a focal distance series in steps, necessary for the adjustment of projection conditions, using the same types of glass for equivalent lenses poses a decisive technological advantage. Furthermore, only technologically advantageous, i.e. process and cost effective glasses are used.

One preferred application of a projection objective according to the invention is the use of the objective alone, i.e. without additional components. It is entirely usual within the context of the invention to combine separate optical components with the projection objective. These components may, for example, be objective attachments or objective supplements, especially attachments for focal length variation and anamorphic attachments for panorama wide screen projection. It is conceivable to integrate attachments mechanically.

BRIEF DESCRIPTION OF DRAWINGS

FIG. 1.1a illustrates the system's sectional view with numbered lenses and flux progression on the meridional level for the reproduction of different object points, with the diaphragm being located between lenses 2 and 3.

FIG. 1.1b illustrates the system's sectional view with flux progression on the meridional level for the reproduction of the most outward object (the object area's diagonal) and characteristic angles σRBa and σRBi with values: σRBa=4.4° and σRBi=17.1° for an entrance pupil location LEP=166mm.

FIG. 1.2 is a graph illustrating a course of vignetting for the 3 main colors λ(d)=587.6nm, λ(C)=656.3nm and λ(F)=486.1nm with weightings λ(d)=1, λ(C)=λ(F)=0.5, depending on half image angle w(wmax=13.2°). Minimal vignetting value amounts to 74% and is essentially also determined by angle σRBa.

FIG. 1.3 is a graph illustrating meridional (tan) and sagittal (sag.) modulation transfer function MTF for the 3 main colors λ(d)=587.6nm, λ(C)=656.3nm and λ(F)=486.1 nm with weightings Λ(d)=1, λ(C)=λ(F)=0.5, depending on half picture angle w (wmax=13.2°) for spatial frequencies 60LP/mm, 30LP/mm and 15LP/mm.

FIG. 1.4 is a graph illustrating spherical aberrations Δy' and Δx' for the 3 main colors in the meridional (T) and sagittal (S) sections, depending on entrance pupil radius pEP for half picture angle w=0, w=0.25 x wmax, w=0.5 x wmax, w=0.75 x wmax as parameter with w=wmax=13.2°.

FIGS. 1.5a to 1.5c are graphs illustrating astigmatism for the 3 main colors depending on the picture's angle, with a maximum astigmatic difference of 0.03mm.

FIG. 1.6 is a graph illustrating a distortion depending on the picture angle for the mid-primary color, wherein the distortion achieves a maximum deviation of 0.7% at image margin.

FIGS. 2.1 to 2.6 illustrate the luminous projection objective with a level object field in the same manner as was the case in FIGS. 1.1 to 1.6.

FIG. 2.1a illustrates the system's section with numbered lenses and flux progression on the meridional level for the reproduction of various object points, with the diaphragm being located between lenses 2 and 3.

FIG. 2.1b illustrates the system's section with flux progression on the meridional level for the reproduction of the most outward object point (object field's diagonal) and characteristic angles σRBa and σRBi with values: σRBa=5.3° and σRbi=16.2° for an entrance pupil location LEP=199mm.

FIG. 2.2 is an equivalent to FIG. 1.2, with a minimum vignetting value of 74%.

FIG. 2.3 is an equivalent to FIG. 1.3, with a contrast remaining practically constant throughout the entire image area for 30LP/mm with a high absolute value of approximately 78%.

FIG. 2.4 is an equivalent to FIG. 1.4.

FIGS. 2.5a to 2.5c are equivalent to FIGS. 1.5a to 1.5c, except the curves refer to a level image area.

FIG. 2.6 is an equivalent to FIG. 1.6.

DETAILED DESCRIPTION OF THE PREFERRED EMBODIMENT

Preliminary Remark:

For practical reasons, the sectional views, flux progressions and evaluation of reproduction quality in the following illustrations refer to a reversed position opposite the projection objective's position of use (reproduction from enlarged to shrunk side.) The entrance's intersection width s=infinite. Therefore the original object is inevitably turned toward the image and reversed. This reversal is referenced colloquially. An exception to this is pupil reproduction (orientation in position of use). This should be noted in the following explanations.

The following illustrations exhibit the luminous projection objective with a curved image area according to claim 3:

1.1a System's sectional view with numbered lenses and flux progression on the meridional level for the reproduction of different object points. The diaphragm is located between lenses 2 and 3.

1.1b System's sectional view with flux progression on the meridional level for the reproduction of the most outward object (the object area's diagonal) and characteristic angles σRBa and σRBi with values: σRBa=4.4° and σRBi=17.1° for an entrance pupil location LEP=166 mm. Therefore the pupil's size and angular location relative to the solid angle axis for the reproduction of axial and extra-axial points up to the margin are optimized for the condenser systems' luminous flux diffusion. In addition, the angular values of σRBa and σRBi ensure that energetically important areas of luminous flux diffusion, which are field-dependent, are captured by the pupil, yet they also ensure that unnecessary areas of luminous flux diffusion are not positioned in the pupil's area, as they are energetically insignificant. This introduction of vignetting, which is oriented and guided by the actual relationship of the condenser systems, also prevents pupil areas from negatively impacting reproduction quality in the corrective compensation during optimization of reproduction quality, as they, in any case, play only an insignificant role in the entire reproduction.

1.2 Course of vignetting for the 3 main colors λ(d)=587.6 nm, λ(C)=656.3 nm and λ(F)=486.1 nm with weightings λ(d)=1, λ(C)=λ(F)=0.5, depending on half image angle w(wmax=13.2°). Minimal vignetting value amounts to 74% and is essentially also determined by angle σRBa. A comparison to the aforementioned solutions (DE-OS 3833946) clearly shows significantly lower vignetting of approximately 12%, less abruptly and progressively decreasing curve progression and also a considerably larger opening.

1.3 Meridional (tan) and sagittal (sag.) modulation transfer function MTF for the 3 main colors λ(d)=587.6 nm, λ(C)=656.3 nm and λ(F)=486.1 nm with weightings Λ(d)=1, λ(C)=λ(F)=0.5, depending on half picture angle w (wmax=13.2°) for spatial frequencies 60 LP/mm, 30 LP/mm and 15 LP/mm. A comparison to the aforementioned solutions (DE-OS 3833946) shows much better and balanced reproduction quality throughout the entire image area when being fully open. As it were, contrast remains constant throughout the entire image area for 30 LP/mm at a high absolute value of approximately 80%, while the aforementioned solutions exhibit a contrast decrease of 20% with a lesser diaphragm value of k=2.0 and an absolute contrast value declining to 60%.

1.4 Spherical aberrations Δy' and Δx' for the 3 main colors in the meridional (T) and sagittal (S) sections, depending on entrance pupil radius pEP for half picture angle w=0, w=0.25×wmax, w=0.5×wmax, w=0.75×wmax as parameter with w=wmax=13.2°. These curves show the corrective behavior, depending on the pupil and field coordinates for these 3 wavelengths. They confirm the excellent reproduction quality throughout the entire image area, as demonstrated already by the modulation transfer function's curve progression, and provide deeper insight into the system's corrective behavior. They further illustrate excellent axial and lateral color correction.

1.5a to 1.5c Astigmatism for the 3 main colors depending on the picture's angle. Maximum astigmatic difference is 0.03 mm. This is the maximum deviation between the meridional and sagittal curve progressions, i.e. the deviation from the curved image shell. It is a very small value, which in any case appears only in a certain zone of the object field and again becomes zero at image margin.

1.6 Distortion depending on the picture angle for the mid-primary color. Distortion achieves a maximum deviation of 0.7% at image margin.

Therefore the two aberrations according to illustrations 1.5a to 1.5c and 1.6 are also better, respectively the same, compared to the aforementioned solutions (DE-OS 3833946).

Illustrations 2.1 to 2.6 illustrate the luminous projection objective with a level object field according to claim 4 in the same manner as was the case in illustrations 1.1 to 1.6. The illustrations show:

2.1a System's section with numbered lenses and flux progression on the meridional level for the reproduction of various object points. The diaphragm is located between lenses 2 and 3.

2.1b System's section with flux progression on the meridional level for the reproduction of the most outward object point (object field's diagonal) and characteristic angles σRBa and σRBi with values: σRBa=5.3° and σRBi=16.2° for an entrance pupil location LEP=199 mm.

2.2 is equivalent to illustration 1.2. Minimum vignetting value is 74%.

2.3 is equivalent to illustration 1.3. Contrast remains practically constant throughout the entire image area for 30 LP/mm with a high absolute value of approximately 78%.

2.4 is equivalent to illustration 1.4.

2.5a to 2.5c are equivalent to illustrations 1.5a to 1.5c. In this case, however, the curves refer to a level image area.

2.6 is equivalent to illustration 1.6.

The curve progressions in illustrations 2.2 to 2.6, all of which contain an evaluation of reproduction quality, show that the same grade of reproduction is possible even with level image areas.

Preferably, a projection objective lens assembly for projecting a projected object from an image comprises seven lenses bordering to space on both sides. The seven lenses include, from an image side to a projected object side: a first biconvex lens; a second negative lens, with a concave surface on the image side; a third positive lens, with a convex surface on the image side; a fourth negative lens, with a concave surface on the object side; a fifth negative lens, with a concave surface on the image side; a sixth positive lens, with a convex surface on the object side; and a seventh biconvex lens. Each of the seven lenses include an aperture angle on the object side greater than or equal to about 12.8°, a distance of the entrance pupil on the object side to an object level is equal to or from about 100 mm to about 400 mm, an outward angular slope of an outward ray opposite an optical axis in an object space between the object and a first lens area of the object, which limits a bundle for a field margin outwardly, of greater than or equal to about 1°, and an inward angular slope of an inward ray opposite an optical axis in the object space between the object and the first lens area of the object, which limits a bundle for a field margin inwardly, of less than or equal to about −14°. The outward ray angle slopes and the inward ray angle slopes are positive if the outward ray and the inward ray intersect the optical axis at a location which, when seen from the object, is in an opposite direction to projection. The outward ray angle slopes and the inward ray angle slopes are negative if the outward ray and the inward ray intersect the optical axis at a location which, when seen from the object, is in an opposite direction to projection.

More preferably, the projection objective assembly includes a first space located to the image side of the first lens, a second space located between the first lens and the second lens, a third space located between the second lens and the third lens, a fourth space located between the third lens and the fourth lens, a fifth space located between the fifth lens and the sixth lens, a sixth space located between the sixth lens and the seventh lens, and a seventh space located to the object side of the seventh lens.

The first space has a radius value of an object side refractive radius divided by a focal distance of the projection objective lens assembly between about 0.89 mm and about 1.37 mm, and a refractive index of about 1.0000.

The first lens has a radius value of an object side refractive radius divided by a focal distance of the projection objective lens assembly between about −1.34 mm and about 0.93 mm, a vortex distance between the object side of the first space and the object side of the first lens divided by the focal distance of the projection objective lens assembly of between about 0.10 and about 0.16, a refractive index greater than about 1.60, and an Abbe value of less than about 50.

The second space has a radius value of an object side refractive radius divided by a focal distance of the projection objective lens assembly between about −0.96 mm and about −0.79 mm, a vortex distance between the object side of the first lens and the object side of the second space divided by the focal distance of the projection objective lens assembly of between about 0.005 and about 0.02, and a refractive index of about 1.0000.

The second lens has a radius value of an object side refractive radius divided by a focal distance of the projection objective lens assembly of less than about −2.00 mm, a vortex distance between the object side of the second space and the object side of the second lens divided by the focal distance of the projection objective lens assembly of between about 0.04 and about 0.08, a refractive index greater than about 1.59, and an Abbe value of less than about 50.

The third space has a radius value of an object side refractive radius divided by a focal distance of the projection objective lens assembly between about 0.43 mm and about 0.55 mm, a vortex distance between the object side of the second lens and the object side of the third space divided by the focal distance of the projection objective lens assembly of between about 0.001 and about 0.004, and a refractive index of about 1.0000.

The third lens has a radius value of an object side refractive radius divided by a focal distance of the projection objective lens assembly between about −4.03 turn and about −1.09 mm, a vortex distance between the object side of the third space and the object side of the third lens divided by the focal distance of the projection objective lens assembly of between about 0.11 and about 0.20, a refractive index greater than about 1.60, and an Abbe value of greater than about 45.

The fourth space has a radius value of an object side refractive radius divided by a focal distance of the projection objective lens assembly less than about 2.00 mm or above about −8.0 mm, a vortex distance between the object side of the third lens and the object side of the fourth space divided by the focal distance of the projection objective lens assembly of between about 0.001 and about 0.03, and a refractive index of about 1.0000.

The fourth lens has a radius value of an object side refractive radius divided by a focal distance of the projection objective lens assembly between about 0.30 nun and about 0.38 mm, a vortex distance between the object side of the fourth space and the object side of the fourth lens divided by the focal distance of the projection objective lens assembly of between about 0.03 and about 0.12, a refractive index greater than about 1.59, and an Abbe value of less than about 40.

The fifth space has a radius value of an object side refractive radius divided by a focal distance of the projection objective lens assembly between about −0.35 mm and about −0.27 mm, a vortex distance between the object side of the fourth lens and the object side of the fifth space divided by the focal distance of the projection objective lens assembly of between about 0.16 and about 0.26, and a refractive index of about 1.0000.

The fifth lens has a radius value of an object side refractive radius divided by a focal distance of the projection objective lens assembly between about 0.98 mm and about 3.73 mm, a vortex distance between the object side of the fifth space and the object side of the fifth lens divided by the focal distance of the projection objective lens assembly of between about 0.03 and about 0.10, a refractive index greater than about 1.59, and an Abbe value of less than about 40.

The sixth space has a radius value of an object side refractive radius divided by a focal distance of the projection objective lens assembly between about −3.15 mm and about −1.82 mm, a vortex distance between the object side of the fifth lens and the object side of the sixth space divided by the focal distance of the projection objective lens assembly of between about 0.01 and about 0.08, and a refractive index of about 1.0000.

The sixth lens has a radius value of an object side refractive radius divided by a focal distance of the projection objective lens assembly between about −5.10 mm and about −0.40 mm, a vortex distance between the object side of the sixth space and the object side of the sixth lens divided by the focal distance of the projection objective lens assembly of between about 0.08 and about 0.18, a refractive index greater than about 1.60, and an Abbe value of greater than about 45.

The seventh space has a radius value of an object side refractive radius divided by a focal distance of the projection objective lens assembly between about 0.85 mm and about 1.33 mm, a vortex distance between the object side of the sixth lens and the object side of the seventh space divided by the focal distance of the projection objective lens assembly of between about 0.001 and about 0.004, and a refractive index of about 1.0000. The seventh lens has a radius value of an object side refractive radius divided by a focal distance of the projection objective lens assembly between about −1.28 nun and about −0.65 mm, a vortex distance between the object side of the seventh space and the object side of the seventh lens divided by the focal distance of the projection objective lens assembly of between about 0.09 and about 0.27, a refractive index greater than about 1.60, and an Abbe value of greater than about 45.

Even more preferably, the first space has an object side refractive radius of about 60.583 mm, and a refractive index of about 1.0000.

The first lens has an object side refractive radius of about −75.475 mm, a vortex distance between the object side of the first space and the object side of the first lens of about 6.215 mm, a refractive index of about 1.68893, and an Abbe value of about 31.06.

The second space has an object side refractive radius of about −55.307 mm, a vortex distance between the object side of the first lens and the object side of the second space of about 0.800 mm, and a refractive index of about 1.0000.

The second lens has an object side refractive radius of about −656.958 mm, a vortex distance between the object side of the second space and the object side of the second lens of about 2.765 mm, a refractive index of about 1.71736, and an Abbe value of about 29.50.

The third space has an object side refractive radius of about 28.998 mm, a vortex distance between the object side of the second lens and the object side of the third space of about 0.200 mm, and a refractive index of about 1.0000.

The third lens has an object side refractive radius of about −120.159 mm, a vortex distance between the object side of the third space and the object side of the third lens of about 6.912 mm, a refractive index of about 1.64000, and an Abbe value of about 60.05.

The fourth space has an object side refractive radius of about −608.478 mm, a vortex distance between the object side of the third lens and the object side of the fourth space of about 0.200 mm, and a refractive index of about 1.0000.

The fourth lens has an object side refractive radius of about 19.868 mm, a vortex distance between the object side of the fourth space and the object side of the fourth lens of about 6.617 mm, a refractive index of about 1.67270, and an Abbe value of about 32.09.

The fifth space has an object side refractive radius of about −17.785 mm, a vortex distance between the object side of the fourth lens and the object side of the fifth space of about 12.062 mm, and a refractive index of about 1.0000.

The fifth lens has an object side refractive radius of about 149.747 mm, a vortex distance between the object side of the fifth space and the object side of the fifth lens of about 2.556 mm, a refractive index of about 1.71736, and an Abbe value of about 29.50.

The sixth space has an object side refractive radius of about −184.302 mm, a vortex distance between the object side of the fifth lens and the object side of the sixth space of about 1.000 mm, and a refractive index of about 1.0000.

The sixth lens has an object side refractive radius of about −25.205 mm, a vortex distance between the object side of the sixth space and the object side of the sixth lens of about 6.195 mm, a refractive index of about 1.70000, and an Abbe value of about 48.06.

The seventh space has an object side refractive radius of about 64.146 mm, a vortex distance between the object side of the sixth lens and the object side of the seventh space of about 0.100 mm, and a refractive index of about 1.0000.

The seventh lens has an object side refractive radius of about −47.864 mm, a vortex distance between the object side of the seventh space and the object side of the seventh lens of about 9.399 mm, a refractive index of about 1.70000, and an Abbe value of about 48.06.

The focal distance of the projection objective lens assembly is about 60 mm, a relative opening is 1:1.9, a picture angle is 26.40 and an object field is curved. In an alternative more preferred embodiment, the first space has a refractive radius of about 58.672 mm, and a refractive index of about 1.0000.

The first lens has an object side refractive radius of about −69.023 mm, a vortex distance between the object side of the first space and the object side of the first lens of about 6.436 mm, a refractive index of about 1.68893, and an Abbe value of about 31.06.

The second space has an object side refractive radius of about −52.519 mm, a vortex distance between the object side of the first lens and the object side of the second space of about 0.800 mm, and a refractive index of about 1.0000.

The second lens has an object side refractive radius of about −2,339,829 mm, a vortex distance between the object side of the second space and the object side of the second lens of about 2.892 mm, a refractive index of about 1.71736, and an Abbe value of about 29.50.

The third space has an object side refractive radius of about 25.774 mm, a vortex distance between the object side of the second lens and the object side of the third space of about 0.200 mm, and a refractive index of about 1.0000.

The third lens has an object side refractive radius of about −140.168 mm, a vortex distance between the object side of the third space and the object side of the third lens of about 7.955 mm, a refractive index of about 1.64000, and an Abbe value of about 60.05.

The fourth space has an object side refractive radius of about 738.395 mm, a vortex distance between the object side of the third lens and the object side of the fourth space of about 0.200 mm, and a refractive index of about 1.0000.

The fourth lens has an object side refractive radius of about 18.251 mm, a vortex distance between the object side of the fourth space and the object side of the fourth lens of about 4.000 mm, a refractive index of about 1.67270, and an Abbe value of about 32.09.

The fifth space has an object side refractive radius of about −16.267 mm, a vortex distance between the object side of the fourth lens and the object side of the fifth space of about 12.868 mm, and a refractive index of about 1.0000.

The fifth lens has an object side refractive radius of about 112.132 mm, a vortex distance between the object side of the fifth space and the object side of the fifth lens of about 3.000 mm, a refractive index of about 1.71736, and an Abbe value of about 29.50.

The sixth space has an object side refractive radius of about −188.336 mm, a vortex distance between the object side of the fifth lens and the object side of the sixth space of about 1.300 mm, and a refractive index of about 1.0000.

The sixth lens has an object side refractive radius of about −24.858 mm, a vortex distance between the object side of the sixth space and the object side of the sixth lens of about 5.849 mm, a refractive index of about 1.70000, and an Abbe value of about 48.06.

The seventh space has an object side refractive radius of about 70.379 mm, a vortex distance between the object side of the sixth lens and the object side of the seventh space of about 0.100 mm, and a refractive index of about 1.0000.

The seventh lens has an object side refractive radius of about −40.309 mm, a vortex distance between the object side of the seventh space and the object side of the seventh lens of about 8.858 mm, a refractive index of about 1.70000, and an Abbe value of about 48.06. The focal distance of the projection objective lens assembly is about 60 mm, a relative opening is 1:1.9, a picture angle is 26.40 and an object field is level.

What is claimed is:

1. A projection objective consisting of seven lenses bordering to space on both sides, characterized by the following conditional equations, which must be met in their entirety:

$$u \geq 12.8°,$$

$$100 \text{ mm} \leq LEP \leq 400 \text{ mm},$$

$$\sigma RBa \geq 1°,$$

$$\sigma RBi \geq -14°,$$

whereby u is the aperture angle (2u-entire angle) on the lighting side,

LEP is the distance of the entrance pupil (on the lighting side) to object level (the location in direction of projection from reference point object level is a positive number), σRBa is the ray's angular slope opposite the optical axis in the object space between the object and the objective's $1^{st}$ lens area, which limits the bundle for the field margin (object's outer field point) outwardly (away from the optical axis, distant from the axis) and σRBi is the ray's angular slope opposite the optical axis in the object space between the object and the objective's $1^{st}$ lens area, which limits the bundle for the field margin (object's outer field point) inwardly (toward the optical axis, near the axis), as well as that angles σRBa and σRBi are positive, if the respective rays intersect the optical axis at a location, which, when seen from the object, is in the opposite direction to projection and negative, if intersecting the optical axis at a location, which, when seen from the object, is in direction of projection, with the following lens locations in sequence from image (enlarged side) to object (shrunk and lighting side):

a first biconvex lens (1), a second negative lens (2), with concave surface at image side, a third positive lens (3), with convex surface at image side, a fourth negative lens (4), with concave surface on object side, a fifth negative lens (5), with concave surface at image side, a sixth positive lens (6), with convex surface on object side, and a seventh biconvex lens (7).

2. A projection objective according to claim 1, characterized by the following data for lenses (1 to 7):

TABLE 1

| Lens No. j | Area No. i | Radius ri/f' | Thickness and Distance di/f' | Refractive Index Value nd | Abbe Value vd |
|---|---|---|---|---|---|
| 1 | 1 | 0.89 < ri/f' < 1.37 | — | 1.0000 | — |
|   | 2 | −1.34 < ri/f' < −0.93 | 0.10 < di/f' < 0.16 | >1.60 | <50 |
|   | 3 | −0.96 < ri/f' < −0.79 | 0.005 < di/f' < 0.02 | 1.0000 | — |
| 2 | 4 | −∞ ≦ ri/f' < −2.00 | 0.04 < di/f' < 0.08 | >1.59 | <50 |
|   | 5 | 0.43 < ri/f' < 0.55 | 0.001 < di/f' < 0.004 | 1.0000 | — |
| 3 | 6 | −4.03 < ri/f' < −1.09 | 0.11 < di/f' < 0.20 | >1.60 | >45 |
|   | 7 | −∞ ≦ ri/f' < −2.00 | 0.001 < di/f' < 0.03 | 1.0000 | — |
|   |   | 8.0 < ri/f' ≦ ∞ |   |   |   |
| 4 | 8 | 0.30 < ri/f' < 0.38 | 0.03 < di/f' < 0.12 | >1.59 | <40 |
|   | 9 | −0.35 < ri/f' < −0.27 | 0.16 < di/f' < 0.26 | 1.0000 | — |
| 5 | 10 | 0.98 < ri/f' < 3.73 | 0.03 < di/f' < 0.10 | >1.59 | <40 |
|   | 11 | −3.15 < ri/f' < −1.82 | 0.01 < di/f' < 0.08 | 1.0000 | — |
| 6 | 12 | −5.10 < ri/f' < −0.40 | 0.08 < di/f' < 0.18 | >1.60 | >45 |
|   | 13 | 0.85 < ri/f' < 1.33 | 0.001 < di/f'0.004 | 1.0000 | — |
| 7 | 14 | −1.28 < ri/f' < −0.65 | 0.09 < di/f' < 0.27 | >1.60 | >45 | and
f' the system's focal distance in mm,
j the number of lenses,
I the refractive area's value,
ri the i-$^{th}$ refractive area's radius in mm,
di the vertex distance between areas i and i-1 in mm,
nd the glass' refractive index for line d and
vd the glass' Abbe number for line d.

3. A projection objective according to claim 2, characterized by the following data for lenses (1 to 7):

TABLE 2

| Lens No. j | Area No. i | Radius ri/f' | Thickness and Distance di/f' | Refractive Index Value nd | Abbe Value vd |
|---|---|---|---|---|---|
| 1 | 1 | 60.583 | — | 1.0000 | — |
|   | 2 | −75.475 | 6.215 | 1.68893 | 31.06 |
|   | 3 | −55.307 | 0.800 | 1.0000 | — |
| 2 | 4 | −656.958 | 2.765 | 1.71736 | 29.50 |
|   | 5 | 28.998 | 0.200 | 1.0000 | — |
| 3 | 6 | −120.159 | 6.912 | 1.64000 | 60.05 |
|   | 7 | −608.478 | 0.200 | 1.0000 | — |
| 4 | 8 | 19.868 | 6.617 | 1.67270 | 32.09 |
|   | 9 | −17.785 | 12.062 | 1.0000 | — |
| 5 | 10 | 149.747 | 2.556 | 1.71736 | 29.50 |
|   | 11 | −184.302 | 1.000 | 1.0000 | — |
| 6 | 12 | −25.205 | 6.195 | 1.70000 | 48.06 |
|   | 13 | 64.146 | 0.100 | 1.0000 | — |
| 7 | 14 | −47.864 | 9.399 | 1.70000 | 48.06 | f' = 60 mm,
relative opening: 1:1.9
picture angle: 2 w = 26.4
curved object field.

f'=60 mm, relative opening: 1:1.9 picture angle: 2w=26.4 curved object field.

4. A projection objective according to claim 2, characterized by the following data for lenses (1 to 7):

TABLE 3

| Lens No. j | Area No. i | Radius ri/f' | Thickness and Distance di/f' | Refractive Index Value nd | Abbe Value vd |
|---|---|---|---|---|---|
| 1 | 1 | 58.672 | — | 1.0000 | — |
|   | 2 | −69.023 | 6.436 | 1.68893 | 31.06 |
|   | 3 | −52.519 | 0.800 | 1.0000 | — |
| 2 | 4 | −2339.829 | 2.892 | 1.71736 | 29.50 |
|   | 5 | 25.774 | 0.200 | 1.0000 | — |
| 3 | 6 | −140.168 | 7.955 | 1.64000 | 60.05 |
|   | 7 | 738.395 | 0.200 | 1.0000 | — |
| 4 | 8 | 18.251 | 4.000 | 1.67270 | 32.09 |
|   | 9 | −16.267 | 12.868 | 1.0000 | — |
| 5 | 10 | 112.132 | 3.000 | 1.71736 | 29.50 |
|   | 11 | −188.336 | 1.300 | 1.0000 | — |
| 6 | 12 | −24.858 | 5.849 | 1.70000 | 48.06 |
|   | 13 | 70.379 | 0.100 | 1.0000 | — |
| 7 | 14 | −40.309 | 8.858 | 1.70000 | 48.06 | f' = 60 mm,
relative opening: 1:1.9
picture angle: 2 w = 26.4
level object field.

f'=60 mm, relative opening: 1:1.9 picture angle: 2w=26.4 level object field.

5. A projection objective lens assembly for projecting a projected object from an image comprising:
   seven lenses bordering to space on both sides; the seven lenses including, from an image side to a projected object side:
   a first biconvex lens;
   a second negative lens, with a concave surface on the image side;
   a third positive lens, with a convex surface on the image side;
   a fourth negative lens, with a concave surface on the object side;
   a fifth negative lens, with a concave surface on the image side;
   a sixth positive lens, with a convex surface on the object side; and a seventh biconvex lens;

wherein each of the seven lenses include an aperture angle on the object side greater than or equal to about 12.8°, a distance of the entrance pupil on the object side to an object level is equal to or from about 100 mm to about 400 mm, an outward angular slope of an outward ray opposite an optical axis in an object space between the object and a first lens area of the object, which limits a bundle for a field margin outwardly, of greater than or equal to about 10, and an inward angular slope of an inward ray opposite an optical axis in the object space between the object and the first lens area of the object, which limits a bundle for a field margin inwardly, of less than or equal to about −44°;

wherein the outward ray angle slopes and the inward ray angle slopes are positive if the outward ray and the inward ray intersect the optical axis at a location which, when seen from the object, is in an opposite direction to projection; and wherein the outward ray angle slopes and the inward ray angle slopes are negative if the outward ray and the inward ray intersect the optical axis at a location which, when seen from the object, is in an opposite direction to projection.

6. The projection objective assembly of claim 5, further including:

a first space located to the image side of the first lens;

a second space located between the first lens and the second lens;

a third space located between the second lens and the third lens;

a fourth space located between the third lens and the fourth lens;

a fifth space located between the fifth lens and the sixth lens;

a sixth space located between the sixth lens and the seventh lens;

a seventh space located to the object side of the seventh lens; wherein:

the first space has a radius value of an object side refractive radius divided by a focal distance of the projection objective lens assembly between about 0.89 mm and about 1.37 mm, and a refractive index of about 1.0000;

the first lens has a radius value of an object side refractive radius divided by a focal distance of the projection objective lens assembly between about −1.34 mm and about 0.93 mm, a vortex distance between the object side of the first space and the object side of the first lens divided by the focal distance of the projection objective lens assembly of between about 0.10 and about 0.16, a refractive index greater than about 1.60, and an Abbe value of less than about 50;

the second space has a radius value of an object side refractive radius divided by a focal distance of the projection objective lens assembly between about −0.96 mm and about −0.79 mm, a vortex distance between the object side of the first lens and the object side of the second space divided by the focal distance of the projection objective lens assembly of between about 0.005 and about 0.02, and a refractive index of about 1.0000;

the second lens has a radius value of an object side refractive radius divided by a focal distance of the projection objective lens assembly of less than about −2.00 mm, a vortex distance between the object side of the second space and the object side of the second lens divided by the focal distance of the projection objective lens assembly of between about 0.04 and about 0.08, a refractive index greater than about 1.59, and an Abbe value of less than about 50;

the third space has a radius value of an object side refractive radius divided by a focal distance of the projection objective lens assembly between about 0.43 mm and about 0.55 mm, a vortex distance between the object side of the second lens and the object side of the third space divided by the focal distance of the projection objective lens assembly of between about 0.001 and about 0.004, and a refractive index of about 1.0000;

the third lens has a radius value of an object side refractive radius divided by a focal distance of the projection objective lens assembly between about −4.03 mm and about −1.09 mm, a vortex distance between the object side of the third space and the object side of the third lens divided by the focal distance of the projection objective lens assembly of between about 0.11 and about 0.20, a refractive index greater than about 1.60, and an Abbe value of greater than about 45;

the fourth space has a radius value of an object side refractive radius divided by a focal distance of the projection objective lens assembly less than about 2.00 mm or above about −8.0 mm, a vortex distance between the object side of the third lens and the object side of the fourth space divided by the focal distance of the projection objective lens assembly of between about 0.001 and about 0.03, and a refractive index of about 1.0000;

the fourth lens has a radius value of an object side refractive radius divided by a focal distance of the projection objective lens assembly between about 0.30 mm and about 0.38 mm, a vortex distance between the object side of the fourth space and the object side of the fourth lens divided by the focal distance of the projection objective lens assembly of between about 0.03 and about 0.12, a refractive index greater than about 1.59, and an Abbe value of less than about 40;

the fifth space has a radius value of an object side refractive radius divided by a focal distance of the projection objective lens assembly between about −0.35 mm and about −0.27 mm, a vortex distance between the object side of the fourth lens and the object side of the fifth space divided by the focal distance of the projection objective lens assembly of between about 0.16 and about 0.26, and a refractive index of about 1.0000;

the fifth lens has a radius value of an object side refractive radius divided by a focal distance of the projection objective lens assembly between about 0.98 mm and about 3.73 mm, a vortex distance between the object side of the fifth space and the object side of the fifth lens divided by the focal distance of the projection objective lens assembly of between about 0.03 and about 0.10, a refractive index greater than about 1.59, and an Abbe value of less than about 40;

the sixth space has a radius value of an object side refractive radius divided by a focal distance of the projection objective lens assembly between about −3.15 mm and about −1.82 mm, a vortex distance between the object side of the fifth lens and the object side of the sixth space divided by the focal distance of the projection objective lens assembly of between about 0.01 and about 0.08, and a refractive index of about 1.0000;

the sixth lens has a radius value of an object side refractive radius divided by a focal distance of the projection objective lens assembly between about −5.10 mm and about −0.40 mm, a vortex distance between the object side of the sixth space and the object side of the sixth lens divided by the focal distance of the projection objective lens assembly of between about 0.08 and about 0.18, a refractive index greater than about 1.60, and an Abbe value of greater than about 45;

the seventh space has a radius value of an object side refractive radius divided by a focal distance of the projection objective lens assembly between about 0.85 mm and about 1.33 mm, a vortex distance between the object side of the sixth lens and the object side of the seventh space divided by the focal distance of the projection objective lens assembly of between about 0.001 and about 0.004, and a refractive index of about 1.0000; and the seventh lens has a radius value of an object side refractive radius divided by a focal distance of the projection objective lens assembly between about −1.28 mm and about −0.65 mm, a vortex distance between the object side of the seventh space and the object side of the seventh lens divided by the focal distance of the projection objective lens assembly of between about 0.09 and about 0.27, a refractive index greater than about 1.60, and an Abbe value of greater than about 45.

7. The projection objective assembly of claim 6, wherein:

the first space has an object side refractive radius of about 60.583 mm, and a refractive index of about 1.0000;

the first lens has an object side refractive radius of about −75.475 mm, a vortex distance between the object side of the first space and the object side of the first lens of about 6.215 mm, a refractive index of about 1.68893, and an Abbe value of about 31.06;

the second space has an object side refractive radius of about −55.307 mm, a vortex distance between the object side of the first lens and the object side of the second space of about 0.800 mm, and a refractive index of about 1.0000;

the second lens has an object side refractive radius of about −656.958 mm, a vortex distance between the object side of the second space and the object side of the second lens of about 2.765 mm, a refractive index of about 1.71736, and an Abbe value of about 29.50;

the third space has an object side refractive radius of about 28.998 mm, a vortex distance between the object side of the second lens and the object side of the third space of about 0.200 mm, and a refractive index of about 1.0000;

the third lens has an object side refractive radius of about −120.159 mm, a vortex distance between the object side of the third space and the object side of the third lens of about 6.912 mm, a refractive index of about 1.64000, and an Abbe value of about −60.05;

the fourth space has an object side refractive radius of about −608.478 mm, a vortex distance between the object side of the third lens and the object side of the fourth space of about 0.200 mm, and a refractive index of about 1.0000;

the fourth lens has an object side refractive radius of about 19.868 mm, a vortex distance between the object side of the fourth space and the object side of the fourth lens of about 6.617 mm, a refractive index of about 1.67270, and an Abbe value of about 32.09;

the fifth space has an object side refractive radius of about −17.785 mm, a vortex distance between the object side of the fourth lens and the object side of the fifth space of about 12.062 mm, and a refractive index of about 1.0000;

the fifth lens has an object side refractive radius of about 149.747 mm, a vortex distance between the object side of the fifth space and the object side of the fifth lens of about 2.556 mm, a refractive index of about 1.71736, and an Abbe value of about 29.50;

the sixth space has an object side refractive radius of about −184.302 mm, a vortex distance between the object side of the fifth lens and the object side of the sixth space of about 1.000 mm, and a refractive index of about 1.0000;

the sixth lens has an object side refractive radius of about −25.205 nun, a vortex distance between the object side of the sixth space and the object side of the sixth lens of about 6.195 mm, a refractive index of about 1.70000, and an Abbe value of about 48.06;

the seventh space has an object side refractive radius of about 64.146 mm, a vortex distance between the object side of the sixth lens and the object side of the seventh space of about 0.100 mm, and a refractive index of about 1.0000;

the seventh lens has an object side refractive radius of about −47.864 mm, a vortex distance between the object side of the seventh space and the object side of the seventh lens of about 9.399 mm, a refractive index of about 1.70000, and an Abbe value of about 48.06; and the focal distance of the projection objective lens assembly is about 60 mm, a relative opening is 1:1.9, a picture angle is 26.40 and an object field is curved.

8. The projection objective assembly of claim 6, wherein:

the first space has a refractive radius of about 58.672 mm, and a refractive index of about 1.0000;

the first lens has an object side refractive radius of about −69.023 mm, a vortex distance between the object side of the first space and the object side of the first lens of about 6.436 mm, a refractive index of about 1.68893, and an Abbe value of about 31.06;

the second space has an object side refractive radius of about −52.519 mm, a vortex distance between the object side of the first lens and the object side of the second space of about 0.800 mm, and a refractive index of about 1.0000;

the second lens has an object side refractive radius of about −2,339,829 mm, a vortex distance between the object side of the second space and the object side of the second lens of about 2.892 mm, a refractive index of about 1.71736, and an Abbe value of about 29.50;

the third space has an object side refractive radius of about 25.774 mm, a vortex distance between the object side of the second lens and the object side of the third space of about 0.200 mm, and a refractive index of about 1.0000;

the third lens has an object side refractive radius of about −140.168 mm, a vortex distance between the object side of the third space and the object side of the third lens of about 7.955 mm, a refractive index of about 1.64000, and an Abbe value of about 60.05;

the fourth space has an object side refractive radius of about 738.395 mm, a vortex distance between the object side of the third lens and the object side of the fourth space of about 0.200 mm, and a refractive index of about 1.0000;

the fourth lens has an object side refractive radius of about 18.251 mm, a vortex distance between the object side of the fourth space and the object side of the fourth lens of about 4.000 mm, a refractive index of about 1.67270, and an Abbe value of about 32.09;

the fifth space has an object side refractive radius of about −16.267 mm, a vortex distance between the object side of the fourth lens and the object side of the fifth space of about 12.868 mm, and a refractive index of about 1.0000;

the fifth lens has an object side refractive radius of about 112.132 mm, a vortex distance between the object side of the fifth space and the object side of the fifth lens of about 3.000 mm, a refractive index of about 1.71736, and an Abbe value of about 29.50;

the sixth space has an object side refractive radius of about −188.336 mm, a vortex distance between the object side of the fifth lens and the object side of the sixth space of about 1.300 mm, and a refractive index of about 1.0000;

the sixth lens has an object side refractive radius of about −24.858 mm, a vortex distance between the object side of the sixth space and the object side of the sixth lens of about 5.849 nun, a refractive index of about 1.70000, and an Abbe value of about 48.06;

the seventh space has an object side refractive radius of about 70.379 mm, a vortex distance between the object side of the sixth lens and the object side of the seventh space of about 0.100 mm, and a refractive index of about 1.0000;

the seventh lens has an object side refractive radius of about −40.309 mm, a vortex distance between the object side of the seventh space and the object side of the seventh lens of about 8.858 mm, a refractive index of about 1.70000, and an Abbe value of about 48.06; and the focal distance of the projection objective lens assembly is about 60 mm, a relative opening is 1:1.9, a picture angle is 26.40 and an object field is level.

* * * * *

UNITED STATES PATENT AND TRADEMARK OFFICE
CERTIFICATE OF CORRECTION

PATENT NO. : 6,795,255 B2
DATED : September 21, 2004
INVENTOR(S) : Wolfgang Reinecke et al.

It is certified that error appears in the above-identified patent and that said Letters Patent is hereby corrected as shown below:

<u>Title page,</u>
Item [57], ABSTRACT,
Lines 4 and 5, "σRba" and σRbi" should be -- σRBa and σRBi --.

<u>Column 3,</u>
Line 54, "$\Lambda(d) = 1$" should be -- $\lambda(d) = 1$ --.

<u>Column 4,</u>
Line 12, "σRbi" should be -- σRBi --

<u>Column 5,</u>
Line 7, "$\Lambda(d) = 1$" should be -- $\lambda(d) = 1$ --.

<u>Column 7,</u>
Line 7, "turn" should be -- mm --.
Line 22, "0.30 nun" should be -- 0.30 mm --.

<u>Column 8,</u>
Line 4, "nun" should be -- mm --.

<u>Column 9,</u>
Line 8, "26.40" should be -- 26.4° --.
Line 66, "26.40" should be -- 26.4° --.

<u>Column 11,</u>
Lines 53-56, after line 52, delete next 4 lines (duplicate).

<u>Column 12,</u>
Lines 48-51, after line 47, delete next 4 lines (duplicate).

<u>Column 13,</u>
Line 10, "10" should be -- 1° --.
Line 14, "-44°" should be -- -14° --.

<u>Column 15,</u>
Line 62, "-60.05" should read -- 60.05 --.

UNITED STATES PATENT AND TRADEMARK OFFICE
CERTIFICATE OF CORRECTION

PATENT NO. : 6,795,255 B2
DATED : September 21, 2004
INVENTOR(S) : Wolfgang Reinecke et al.

It is certified that error appears in the above-identified patent and that said Letters Patent is hereby corrected as shown below:

<u>Column 16,</u>
Line 22, "nun" should be -- mm --.
Line 39, "26.40" should be -- 26.4° --.
Line 54, "-2,339,829" should be -- 2,339.829 --.

<u>Column 18,</u>
Line 6, "nun" should be -- mm --.
Line 22, "26.40" should be -- 26.4° --.

Signed and Sealed this

Eighth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,795,255 B2
DATED : September 21, 2004
INVENTOR(S) : Wolfgang Reinecke et al.

It is certified that error appears in the above-identified patent and that said Letters Patent is hereby corrected as shown below:

<u>Title page,</u>
Item [73], Assignee, should read -- Optische Systeme Gottingen ISCO-Optic GmbH, Gottingen (DE); Dr.-Ing. Wolfgang Reinecke Ingenieurbüro für Optik-Entwicklung, Berlin (DE) --.

Signed and Sealed this

First Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,795,255 B2  
APPLICATION NO. : 10/181700  
DATED : September 21, 2004  
INVENTOR(S) : Wolfgang Reinecke et al.

Page 1 of 1

It is certified that error appears in the above-identified patent and that said Letters Patent is hereby corrected as shown below:

Title Page, Under (30) Foreign Application Priority Data;
    after Jan. 18, 2000, "DE" should be --EP--.

Signed and Sealed this

Seventeenth Day of November, 2009

David J. Kappos  
*Director of the United States Patent and Trademark Office*